United States Patent [19]

Brown

[11] Patent Number: 4,590,475
[45] Date of Patent: May 20, 1986

[54] STALL AVOIDANCE SYSTEM FOR AIRCRAFT

[75] Inventor: Jerry A. Brown, Hazelwood, Mo.

[73] Assignee: The United States of America as represented by the Secretary of the Army, Washington, D.C.

[21] Appl. No.: 544,937

[22] Filed: Oct. 24, 1983

[51] Int. Cl.⁴ .................................... G08B 23/00
[52] U.S. Cl. .................. 340/966; 73/178 T; 340/963; 340/969; 364/433; 244/76 R
[58] Field of Search ............. 73/178 T; 340/973, 966, 340/963, 967, 959; 364/463, 435, 433, 434; 244/76 R

[56] References Cited

U.S. PATENT DOCUMENTS

| | | | |
|---|---|---|---|
| 3,033,035 | 5/1962 | Snodgrass | 73/178 T |
| 3,188,861 | 6/1965 | Miller | 73/178 |
| 3,486,722 | 12/1969 | Greene | 244/77 |
| 3,654,443 | 4/1972 | Dendy et al. | 364/435 |
| 3,686,936 | 8/1972 | Daudt, Jr. | 73/180 |
| 3,691,356 | 9/1972 | Miller | 73/178 T |
| 3,735,340 | 5/1973 | Donnelly et al. | 340/27 SS |
| 3,839,699 | 10/1974 | Heinsohn et al. | 340/963 |
| 4,027,839 | 6/1977 | Quinlivan | 340/966 |
| 4,110,605 | 8/1978 | Miller | 73/178 T |
| 4,133,503 | 1/1979 | Bliss | 244/188 |
| 4,196,472 | 4/1980 | Ludwig et al. | 364/431 |
| 4,235,104 | 11/1980 | Hoadley et al. | 73/180 |

OTHER PUBLICATIONS

Wood, 'Technical Aerodynamics', 1935, p. 71.
Perkins, 'Airplane Performance Stability and Control', 544937, p. 7.
Blumenthal, 'Air Crashes', Parade Magazine of The Washington Post, 8/18/63, p. 12.
Preliminary Airworthiness Evaluation of a NASA Automated Stall Warning System, USAAEFA, #81-06-1, Final Report, Jul. 1984.

Primary Examiner—John W. Caldwell, Sr.
Assistant Examiner—Brent A. Swarthout
Attorney, Agent, or Firm—William J. Sheehan; Norman L. Wilson, Jr.

[57] ABSTRACT

An aircraft stall avoidance system uses flight measurements such as accelerations, aircraft configuration, engine power, atmospheric conditions, and other related characteristics in computing the speed at which a specific aircraft is likely to stall in real time. The indicator provides continuous stall avoidance information to the pilot along with positive warning signals when critical safety margins are broached.

6 Claims, 2 Drawing Figures

STALL AVOIDANCE SYSTEM FOR AIRCRAFT

BACKGROUND OF THE INVENTION

1. Field of the Invention

The invention relates, in general, to a stall speed indicator for fixed-wing aircraft and, in particular, to an indicator which provides a continuous readout of the airspeed at which stall of each particular aircraft can be expected to occur.

2. Description of Prior Art

Aircraft stall, a situation that exists when the lift of the aircraft wing is less than the apparent weight of the aircraft, is recognized as a critical aircraft problem. As a result, stall warning and avoidance systems are currently in use in most aircraft systems. Single-engine aircraft frequently employ a reverse-airflow, reed-type aural stall warning horn to alert the pilot when an aircraft stall is imminent. Another conventional warning system involves an annunciator light or horn activated electrically by a micro-switch which is mechanically linked to a small airflow-sensing vane located on the leading edge of an aircraft wing. A third type is used on more sophisticated, high-performance aircraft and includes a wing-mounted lift transducer and angle-of-attack indicator which displays the aircraft angle-of-attack in terms of degrees or percentages of stall angle, or referenced to a desired angle-of-attack.

Some of the difficulties with these prior art devices include the inability to provide continuous stall avoidance information in units of speed, particularly the critical margin below the aircraft's indicated airspeed. In addition, the prior art devices do not directly consider power effect or increase in the potential stalling speed resulting from lift generated by the horizontal tail surfaces. The present invention, which is the subject of the test report USA AEFA Project No. 81-06-1, Final Report, "Preliminary Airworthiness Evaluation of a National Aeronautics and Space Administration Automated Stall Warning System for an OV-1 and the Aircraft", July 1984, incorporates not only the horizontal tail lift and power effect but also normal and longitudinal accelerations, aircraft weight, and wing flap extension into the stall speed computation. Also, most of the prior art indicators require the mounting of a measuring device, such as a stagnation pressure point sensor, on the exterior of the aircraft. The present invention does not require such external appendages on the aircraft.

SUMMARY OF THE INVENTION

Thus, it is an object of the invention to provide a continuous readout of the calculated airspeed at which aerodynamic wing stall is anticipated.

Another object of the invention is to continuously display the predicted wing stall in units of airspeed.

A further object of the invention is to co-locate the stall speed indicator with conventional airspeed instruments.

Briefly, the computer-driven stall speed indicator uses measurements of normal and longitudinal accelerations, aircraft configuration, engine power, and atmospheric conditions along with known aircraft physical and aerodynamic characteristics. Given a specific aircraft, the indicator provides a continuous readout of the calculated airspeed at which aircraft stall is anticipated. By co-locating the indicator with a conventional airspeed indicator, and providing audible warning, the pilot has access to more positive and accurate stall avoidance information than prior art devices. The calculated output is displayed in units of speed which can then be compared directly to the indicated airspeed to quickly inform the pilot of his safety margin from the projected stall speed.

DETAILED DESCRIPTION

Figure 1:
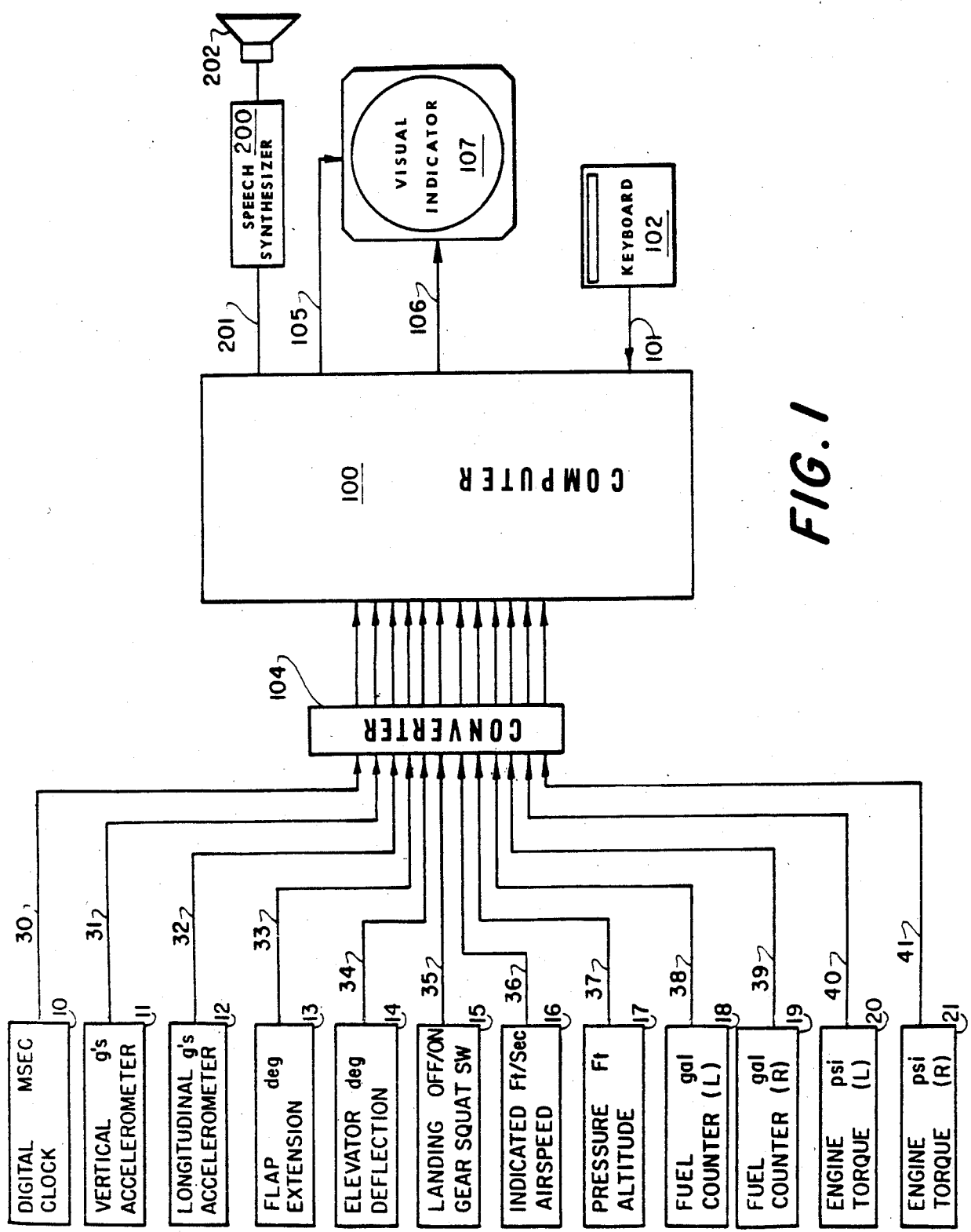
FIG. 1 is a schematic drawing of a working embodiment of the invention disclosing the measured factors of the aircraft as inputs to the system computer.

The first step in understanding the operation of the present invention is to explain the derivation of the measured factors which provide inputs to the system. The computed indicated stall speed (hereafter referred to as Vsi) is derived from the equations of motion along the z flight path axis:

$$MA_{zw} = \frac{W}{g} A_{zw} = -[L_{wfn} + L_T] - T\sin(\alpha_w + \xi_o) + \quad (1)$$

$$Mg[\sin\alpha_w \sin\theta + \cos\alpha_w \cos\theta \cos\phi]$$

where $A_{zw}$ is defined as the body-referenced acceleration normal to the flight path and in the plane of symmetry, ft/sec$^2$, g is the acceleration due to gravity, ft/sec$^2$, $L_T$ is the lift produced by the horizontal tail, perpendicular to the velocity vector and in the plane of symmetry, lb, $L_{wfn}$ is the lift produced by the combination of wing, fuselage and nacelle, perpendicular to the velocity vector and in the plane of symmetry, lb, M is the mass of the aircraft, slugs, T is powerplant thrust, assumed to lie in the plane of symmetry and oriented with respect to the body axes by the thrust inclination angle, lb, W is the weight of the aircraft, lb, $\alpha_w$ is the wing angle of attack, deg, $\epsilon_o$ is the thrust inclination angle with respect to the body axes and in the plane of symmetry, deg, $\phi$ is the aircraft roll attitude, deg, and $\theta$ is the aircraft pitch attitude, deg.

Since aircraft stall is defined relative to wing lift, the total lift must be divided into two parts, wing-fuselage-nacelle ($L_{wfn}$) and tail components ($L_T$), $$L_{tot} = L_{wfn} + L_T. \quad (2)$$

Additionally $$A_{zw} = -\sin\alpha_w A_{xB} + \cos\alpha_w A_{zb} + g[\sin\alpha_w \sin\theta + \cos\alpha_w \cos\theta \cos\phi] \quad (3)$$

where $A_{xB}$ is defined as aircraft acceleration along the longitudinal body axis (x) as measured at the center of gravity, ft/sec$^2$ and $A_{zB}$ is defined as aircraft acceleration along the vertical body axis (z) as measured at the center of gravity, ft/sec$^2$.

With this substitution, equation (1) becomes $$\frac{W}{g}[-\sin\alpha_w A_{xB} + \cos\alpha_w A_{zB}] = \qquad (4)$$

$$-[L_{wfn} + L_T] - T\sin(\alpha_w + \xi_o)$$

or $$L_{wfn} = \frac{W}{g}[\sin\alpha_w A_{xB} - \cos\alpha_w A_{zB}] - L_T - T\sin(\alpha_w + \xi_o). \qquad (5)$$

Using the relationship $$L_{wfn} = \tfrac{1}{2} C_{Lv} \rho_o V_i^2 S_w \qquad (6)$$

where
- $C_{Lv}$ is the effective lift coefficient associated with the wing, dimensionless,
- $\rho_o$ refers to the sea-level-standard air density, slugs/ft$^3$
- $V_i$ is the indicated airspeed, ft/sec and
- $S_w$ is defined as the reference wing area, ft$^2$, equation (5) may be represented as $$\tfrac{1}{2} C_{Lv} \rho_o V_i^2 S_w = W\left[\sin\alpha_w \frac{A_{xB}}{g} - \cos\alpha_w \frac{A_{zB}}{g}\right] - \qquad (7)$$

$$L_T - T\sin(\alpha_w + \xi_o);$$

therefore, relative to accelerometer inputs $a_{xB}$ and $a_{zB}$ (in g's), $$V_i = \sqrt{\frac{2[W(\sin\alpha_w a_{xB} - \cos\alpha_w a_{zB}) - L_T - T\sin(\alpha_w + \xi_o)]}{C_{Lv}\rho_o S_w}}. \qquad (8)$$

Mathematically $a_{xB} = (A_{xB}/g)$, rendering these acceleration values dimensionless. Accordingly, to obtain the indicated stalling speed $V_{si}$, we must substitute the critical (stalling) effective lift coefficient ($C_{Lvcrit}$) for $C_{Lv}$, and the known stalling angle of attack, resulting in $$V_{si} = \sqrt{\frac{2[W(\sin\alpha_w a_{xB} - \cos\alpha_w a_{zB}) - L_T - T\sin(\alpha_w + \xi_o)]}{C_{Lvcrit}\rho_o S_w}}. \qquad (9)$$

Aircraft weight (W) may be entered by the pilot prior to flight and updated continuously by the computer as a function of time, based upon fuel quantity-or fuel totalizer-system inputs. As a potential alternative, aircraft weight may be automatically input by wheel axle-mounted strain gage transducers. Tail lift ($L_T$) is computed as a function of elevator deflection, wing flap position, thrust, and dynamic pressure at the tail. Tail lift coefficient parameters may be obtained from wind tunnel test or actual flight test data for a specific airframe.

As a result of flight testing, observed aircraft stalling speeds in unaccelerated flight are substituted for $V_{si}$ in equation (9) while simultaneous aircraft sensor measurements provide the remaining variables of the equation, resulting in an empirical mapping of $C_{Lvcrit}$ as a function of flap extension and thrust (as estimated by engine torques and atmospheric conditions). The resultant mapped $C_{Lvcrit}$ values, expressed in binomial equation form, can then be utilized to reproduce real time (i.e. any instant in time) numerical $C_L$ values in equation (9) for use in computing stall speed.

Turning to FIG. 1, a working embodiment of the present invention is shown. The system was designed for testing on an Army OV-1C aircraft but the concept is applicable to other aircraft. Sensors 10-21 detecting the required aircraft measurements are shown inputting the system computer 100 via lines 30-41, respectively. Aircraft ramp weight, the final input required for system operation, is entered via line 101 by the crew using keyboard 102. Converter 104 is used to convert the analog outputs from sensors 11-12, 16-17, and 20-21 to transmit digital inputs 50-61 to computer 100.

The digital clock 10 serves as the means for controlling the frequency of stall warning annunciations as a function of the margin of indicated airspeed versus the computed stall speed. Vertical accelerometer 11 provides a normal acceleration reference (g's), and longitudinal accelerometer 12 provides a fore/aft acceleration reference (g's). The flap extension sensor 13 provides a system reference, in degrees, for the effect of the aircraft wing flap extension on the lift coefficient $C_L$ and horizontal tail lift. Elevator deflection sensor 14 measures the elevator position in degrees and operates in conjunction with sensors 13, 16, 17, 20 and 21 to derive a tail lift estimate. The landing gear squat switch 15 detects weight of the aircraft on the wheels and prevents activation of the aural stall warning system until airborne. Aircraft airspeed is indicated in ft/sec by sensor 16, while an altitude pressure reference (ft above sea level) is provided by sensor 17. Digital fuel counter sensors 18 and 19 are used to provide measurements of fuel expended by each powerplant. These measurements, integrated over a period of time, provide a reading of total fuel consumption. Aircraft weight, at any point in time, can then be computed by subtracting the consumed fuel weight from ramp weight, as originally entered by the pilot or crewmember via the alphanumeric keyboard 102. Left and right engine torque signals (calibrated referenced to propeller dome oil pressure in psi) are generated by pressure sensors 20 and 21 respectively. The engine torque signals 40 and 41 are used, in conjunction with sensors 16 and 17, engine modelling and wind tunnel test data for propeller efficiency, to estimate powerplant thrust. The torque signals 40 and 41 are also needed to compute the lift coefficient change ($\Delta C_L$) and estimated tail lift as a function of power.

Upon receiving sensor input via analog signal lines 31-34, 36-37, and 40-41, converter 104 and digital input lines 50-61 (labelled by FIG. 2), computer 100 calculates the predicted stall speed in accordance with the principles of equation (9). The predicted stall speed is transmitted via line 105 to visual indicator 107 and displayed by positioning a pointer "bug." The indicated airspeed is also referenced from computer 100 via line 106 to visual indicator 107 and displayed by positioning the conventional airspeed pointer needle. In this manner the pilot will be provided with information on the margin of stall speed below real time indicated airspeed each time he views visual indicator 107. Concurrently, an audible warning is given when the indicated airspeed broaches the safety margin above the predicted stall speed as defined by MIL-F-8785C. The preferred embodiment illustrates a computer generated signal conducted through line 201 to a speech synthesizer 200 which enunciates the reminder word "airspeed" through a speaker 202.

Figure 2:
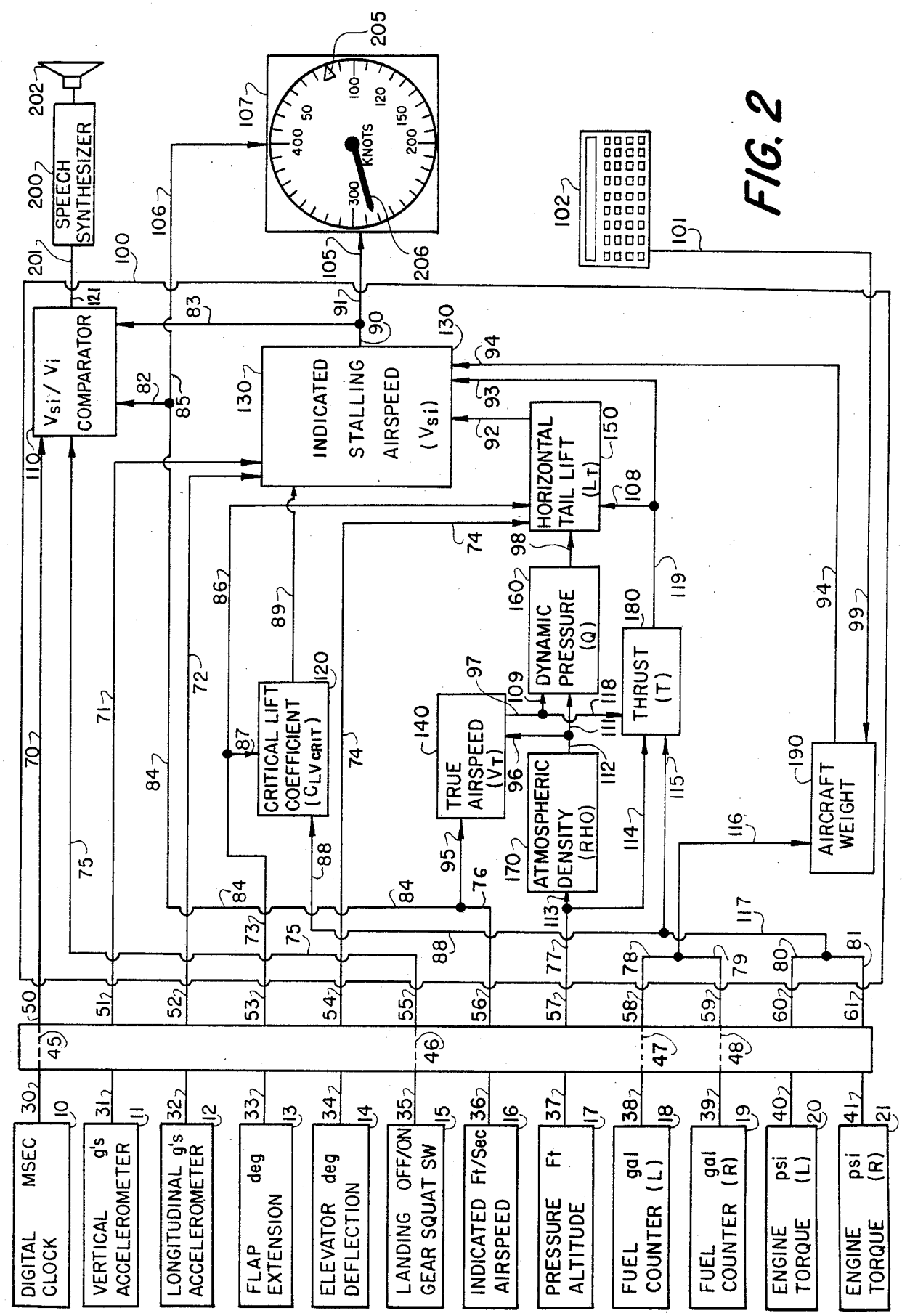
FIG. 2 represents a functional flow block diagram of the mode of operation of the stall avoidance and warning system.

In the functional flow block diagram of FIG. 2, the sensor inputs 50–61 to computer 100 are shown in detail. Using like numerals to indicate the same parts, the various flight measurements as detected by sensors 10–21 are fed through lines 30–41 to converter 104. The digital outputs from converter 104 provide the inputs to computer 100 via lines 50–61. Since the clock, landing gear, and fuel counter signals are detected and fed out in digital form by the sensors 10, 15, 18, and 19 respectively, they are merely conducted through converter 104 as indicated by dashed lines 45–48. Tracing the specific signals to their functional requirement, the digital clock pulse is introduced to computer by line 50 and transmitted via line 70 to $V_{si}/V_i$ comparator 110 where it is used to control the frequency of the stall warning annunciations in proportion to the stall margin ($V_i$ minus $V_{si}$). The signal from vertical accelerometer sensor 11 is referenced into the system 100 at computer input 51 and transmitted via line 71 to stalling airspeed unit 130 where it is used directly in the stall speed computation. Longitudinal accelerometer 12 provides signal 32, also digitized by converter 104 and introduced to computer 100 via line 52, then transmitted via line 72 to the stall speed unit 130. Flap extension signal from sensor 13 enters computer 100 via input 53 and is fed on lines 73 and 87 to critical lift coefficient unit 120. The other input to lift coefficient unit 120 is obtained by adding right and left engine torque sensor signals 80 and 81, then transmitted by lines 117 and 88. Elevator deflection sensor 14 provides the first of four inputs to horizontal tail lift unit 150 through input 54 and conductor 74. A second input to horizontal tail lift unit 150 is derived from flap extension sensor 13 via input 53 and leads 73 and 86. The third input to tail lift component 150 is provided via line 98, dynamic pressure unit 160. The method of deriving a measurement of dynamic pressure begins with an estimate of atmospheric density $\rho$, provided by block 170 as a function of pressure altitude measured by sensor 17 and transmitted by lines 57, 77 and 113. Density output 112 is then split, providing a density estimate to dynamic pressure block 160 via line 111, and transmitting density information to true airspeed block 140 using line 96. True airspeed calculation 140 additionally requires an indicated airspeed measurement provided by sensor 16 and transmitted by lines 56, 76, and 95. True airspeed is then evaluated and provided to dynamic pressure block 160 by lines 97 and 109 to complete the dynamic pressure calculation. The final input to tail lift calculation 150 is powerplant thrust 180, provided to tail lift block 150 via lines 119 and 108. Thrust in itself is a function of true airspeed, transmitted from airspeed block 140 to thrust calculation 180 via lines 97 and 118; pressure altitude, measured by sensor 17 and input by lines 57, 77 and 114; and, finally, engine torques, measured by sensors 20 and 21, transmitted by inputs 60 and 61, mixed at lines 80 and 81 to form input 117, then sent to thrust block 180 via line 115. Squat switch 15 provides an override signal to input 55 when the aircraft weight is detected on the landing gear. The override signal is fed on line 75 to comparator 110 where it inhibits activation of an audible warning signal. The indicated airspeed signal at input 56 is fed along lines 76, 84 and 82 directly to the $V_{si}/V_i$ comparator 110 where it is continually compared to the projected stall speed on line 83 from stall speed computation unit 130 via line 90, and is further transmitted to indicator 107 airspeed needle 206 via lines 85 and 106. Fuel counters 18 and 19 provide information with regard to expended fuel, which is passed to aircraft weight calculation block 190 via line 116 after being totalled at lines 78 and 79 from inputs 58 and 59. The signal input on line 116 to aircraft weight unit 190 is given in terms of weight which is then subtracted in weight calculation unit 190 from the aircraft ramp weight provided on line 99 as input by the pilot or crewmember through keyboard 102 and interface line 101. The output on line 94 thus represents the current adjusted aircraft weight.

In the second stage of calculation, the previously computed aircraft characteristics are fed into the stall speed computation unit 130 to produce the projected stall speed in conjunction with vertical accelerometer input 71, longitudinal accelerometer input 72, critical lift coefficient input 89, horizontal tail lift input 92, powerplant thrust input 93 via line 119, and aircraft weight input 94. The computed stall speed is then fed along lines 90, 91 and 105 to visual indicator 107 indicated stalling speed index bug 205 and along line 83 to comparator 110 where it is continually compared to the current indicated airspeed. When the airspeed broaches the safety margin specified in MIL-F-8785C, comparator 110 generates an output on lines 121 and 201 which activates speech synthesizer 200 and produces an audible warning signal from speaker 202.

Thus, there has been described a novel or effective means for accurately providing aircraft stall warning and avoidance information. Although a single embodiment of the invention has been shown and described, variations and modifications will be apparent to those skilled in the art. It is therefore intended that the invention not be limited to the disclosed embodiment, the true spirit and scope thereof being set forth in the following claims.

What is claimed is:

1. In the method for indicating the speed at which a specific aircraft in maneuvering flight is likely to stall wherein lift coefficients and load factors are used as stall determination parameters, the improvement wherein the effects of thrust are included in combination with instantaneous normal and longitudinal accelerations and tail lift changes in the stall determination for greater accuracy comprising:

observing actual stalling speeds and simultaneously sensed vertical and longitudinal accelerations, flap extension, elevator deflection, indicated airspeed, pressure altitude, and right and left engine torque parameters during flight testing, producing therefrom a mapping of effective critical lift coefficients ($C_{Lvcrit}$) as a function of flap extension and thrust by substituting the simultaneously sensed parameters in the equation $$V_{si} = \sqrt{\frac{2[W(\sin\alpha_w a_{xB} - \cos\alpha_w a_{zB}) - L_T - T\sin(\alpha_w + \xi_o)]}{C_{Lvcrit}\rho_o S_w}} \quad (1)$$

wherein
$V_{si}$ is the indicated stalling speed, ft/sec,
W is the weight of the aircraft, lbs,
$\alpha_w$ is the known stalling angle of attack, deg,
$a_{xB}$ and $a_{zB}$ are the accelerometer inputs, G's, $L_T$ is the lift produced by the horizontal tail, perpendicular to the velocity vector and in the plane of symmetry, lb, T is powerplant thrust, assumed to lie in the plane of symmetry and oriented with respect to the body axes by the thrust inclination angle, lb, $C_{L_{vcrit}}$ is the effective critical lift coefficient associated with the wing, dimensionless, $\rho_o$ refers to the sea-level-standard air density, slugs/ft, $\epsilon_o$ is the thrust inclination angle with respect to the body axes and in the plane of symmetry, deg, $S_w$ is defined as the reference wing area, ft$^2$, from the thus mapped effective critical lift coefficients along with measured aircraft wing flap extension, and aircraft powerplant torques, aircraft altitude and airspeed, expressed in binomial equation form, computing a real time effective critical lift coefficient, and providing an effective critical lift coefficient reference signal;

measuring the body-referenced acceleration about the vertical and longitudinal body axes, and providing reference signals indicative of said acceleration measurements;

measuring the wing flap position, elevator deflection, aircraft indicated altitude and airspeed, and powerplant thrust, and from said flap position, elevator deflection, altitude, airspeed and thrust measurements computing the horizontal tail lift for said aircraft, and providing a tail lift reference signal;

measuring the aircraft powerplant torques, the aircraft airspeed, the pressure altitude of said aircraft, and from said torques, airspeed and pressure altitude measurements computing the thrust, T, of said aircraft, and providing a reference signal indicative of said thrust;

computing the instantaneous weight of said aircraft from the initial aircraft weight and the weight of the fuel expended during flight, and providing a reference signal indicative of said instantaneous aircraft weight; computing said aircraft stall speed using each of said reference signals and the equation (1); and displaying said computed stall speed in units of aircraft speed on the instrument panel of said aircraft to provide a visual representation of said stall speed.

2. The method of indicating the aircraft stall speed of claim 1 wherein said method further includes providing an audible warning signal whenever the aircraft's airspeed broaches a preset safety margin and approaches said computed stall speed.

3. The method of claim 2 wherein said step of providing an audible warning signal includes synthesizing a vocal announcement.

4. Apparatus for indicating the speed at which a specific aircraft in maneuvering flight is likely to stall wherein the effects of thrust are included in combination with instantaneous normal and longitudinal acceleration and tail lift changes in the stall determination for greater accuracy comprising:

means for observing actual stalling speeds and simultaneously sensed vertical and longitudinal accelerations, flap extension, elevator deflection, indicated airspeed, pressure altitude, and right and left engine torque parameters during flight testing, and for producing therefrom a mapping of effective critical lift coefficients as a function of flap extension and thrust;

means for computing real time effective critical lift coefficients utilizing the thus mapped actual effective critical lift coefficients and measured aircraft wing flap extension, and aircraft powerplant torques, aircraft altitude and airspeed, and providing an effective critical lift coefficient reference signal;

means for measuring the body-referenced acceleration about the vertical and longtitudinal body axes, and providing reference signals indicative of said acceleration measurements;

means for measuring the wing flap position, elevator deflection, aircraft indicated altitude and airspeed, and powerplant thrust, and from said flap position, elevator deflection, altitude, airspeed and thrust measurements computing the horizontal tail lift for said aircraft, and providing a tail lift reference signal;

means for measuring the aircraft powerplant torques, the aircraft airspeed, the pressure altitude of said aircraft, and from said torque, airspeed and pressure altitude measurements computing the thrust of said aircraft, and providing a reference signal indicative of said thrust;

means for computing the instantaneous weight of said aircraft from the initial aircraft weight and the weight of the fuel expended during flight, and providing a reference signal indicative of said instantaneous aircraft weight;

means for computing said aircraft stall speed using each of said reference signals as factors; and means for visually displaying said computed stall speed in units of aircraft speed on the instrument panel of said aircraft.

5. The apparatus of claim 4 wherein said apparatus further includes an audible warning signal triggered whenever the aircraft's airspeed broaches a preset safety margin and approaches said computed stall speed.

6. The apparatus of claim 5 wherein said audible warning signal included a synthesized vocal announcement.

* * * * *